(12) United States Patent
Hajdu

(10) Patent No.: US 11,681,483 B2
(45) Date of Patent: Jun. 20, 2023

(54) BUILT-IN PRINT FORMATTING RESPONSIVE TO CONTENT

(71) Applicant: KYOCERA Document Solutions Inc., Osaka (JP)

(72) Inventor: Zsolt Hajdu, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/522,802

(22) Filed: Nov. 9, 2021

(65) Prior Publication Data
US 2023/0145191 A1    May 11, 2023

(51) Int. Cl.
*G06F 3/12* (2006.01)

(52) U.S. Cl.
CPC .......... *G06F 3/1257* (2013.01); *G06F 3/1205* (2013.01); *G06F 3/126* (2013.01); *G06F 3/1258* (2013.01)

(58) Field of Classification Search
CPC .... G06F 3/1257; G06F 3/1205; G06F 3/1258; G06F 3/126
See application file for complete search history.

(56) References Cited

U.S. PATENT DOCUMENTS

| 7,733,509 B2 | 6/2010 | Buis | |
| 2006/0279773 A1* | 12/2006 | Sakurai | G06F 3/1267 358/1.15 |
| 2013/0188207 A1* | 7/2013 | Shiohara | G06F 3/1257 358/1.9 |
| 2018/0336185 A1* | 11/2018 | Fink | G06F 40/109 |
| 2019/0005012 A1* | 1/2019 | Priestas | G06N 20/00 |
| 2021/0150202 A1* | 5/2021 | Denk | G06V 30/274 |

* cited by examiner

*Primary Examiner* — Iriana Cruz
(74) *Attorney, Agent, or Firm* — W. Webostad

(57) ABSTRACT

Systems and methods relate generally to a printing device are disclosed. In an example method thereof, a print job having plain text is received by the printing device. Content of the plain text in the print job is analyzed. The plain text is determined to be for a source code responsive to the analyzing. The plain text is formatted responsive to a template stored for the source code. In another example, a markup language rather than source code is used.

14 Claims, 6 Drawing Sheets

BUILT-IN PRINT FORMATTING RESPONSIVE TO CONTENT

FIELD

The following description relates to a printing device. More particularly, the following description relates to built-in print formatting responsive to content for a printing device.

BACKGROUND

Conventionally, in office and production printers, features and/or settings are immediately available based on factory set defaults. A printer, such as a multi-function printer ("MFP"), a production printer, or a personal printer, come pre-configured with a configuration programmed into such device during via printer firmware. When such a printer is turned ON, its user interface or device panel conventionally shows its initial configuration as pre-defined, such as from a factory.

SUMMARY

In accordance with one or more below described examples, a method relating generally to a printing device is disclosed. In such a method, a print job having plain text is received by the printing device. Content of the plain text in the print job is analyzed. The plain text is determined to be for a source code responsive to the analyzing. The plain text is formatted responsive to a template stored for the source code.

In accordance with one or more below described examples, another method relating generally to a printing device is disclosed. In such a method, a print job having plain text is received by the printing device. Content of the plain text in the print job is analyzed. The plain text is determined to be for a markup language responsive to the analyzing. The plain text is formatted responsive to a template stored for the markup language.

In accordance with one or more below described examples, a system relating generally to a printing device is disclosed. In such a system, the printing device has firmware. The firmware configured to: analyze plain text of a print job received by the printing device; determine whether the plain text is for a type of coding; format the plain text responsive to a template stored in or accessible by the printing device for the type of coding identified; and print the plain text formatted according to the template.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

Figure 1:
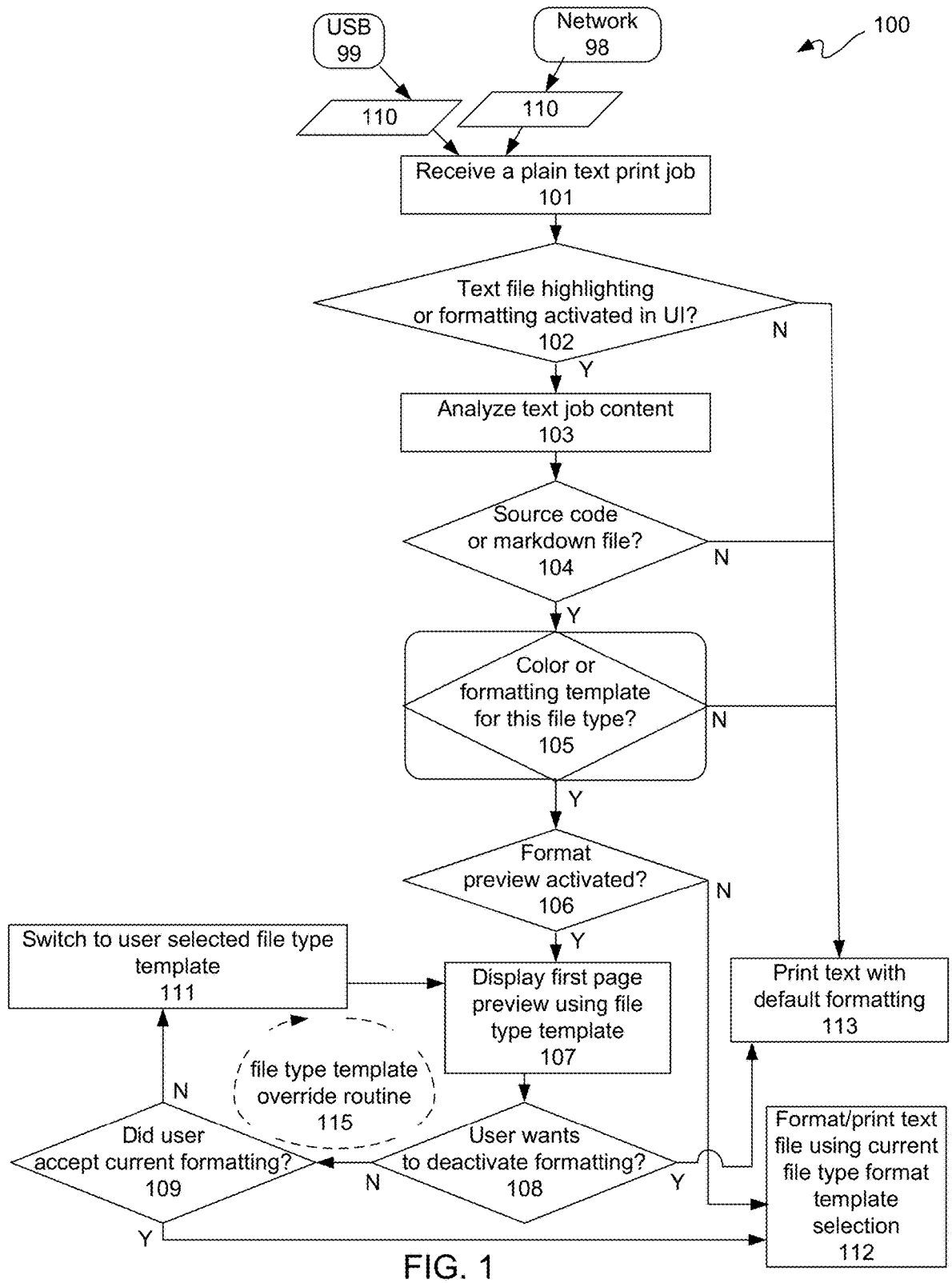
FIG. 1 is a flow diagram depicting an example of a raw text print job formatting flow.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

Generally, in office and production printers, users and/or administrators may set "configurations" that can take effect during use of a device, whether for printing, job storage, scanning, or other function of a printing device. For example, there can be: session-specific configuration (i.e., per printing job for example); default configuration, which takes effect each launch of a printer driver for an associated printing device; or default configuration a single user or all users of a computer system.

Conventional printers, including multi-function printers or MFPs, are able to process and render simple to sophisticated Page Description Language (PDL) print jobs. Conventional printers are further able to render received plain text files. However, conventional printers upon receiving a plain text file print content of such text file without any modification, such as using a default font type and in a plain black color.

For a Windows OS, a virtual printer may be installed using a Generic Text driver that comes with Windows and connects such a virtual printer to a target printer port to FILE, which port may be used to save an output therefrom to a file, such as for testing. For a Linux OS, text files can be sent from a terminal shell prompt using a command, such as for example lp-d PRINTER filename. In an example, a user may be editing a C or Java source code file in an editor or IDE system. Conventional modern text editors recognize a source code type and automatically apply color syntax highlighting when displaying such source code on a monitor or other display screen. But when a user prints such a source code file, a printer output may be simple black text if such editor supports syntax highlighting on a display screen and but not on a printer.

As described below in additional detail, a color printer, including an MFP, may be configured to analyze content of a plain text file to check whether a file type thereof can be determined. If a file type can be determined, such a printer may be configured to automatically apply color syntax highlight to content of such a plain text file to produce a more readable output.

With the above general understanding borne in mind, various configurations for built-in print formatting responsive to content for a printing device are described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1 is a flow diagram depicting an example of a raw text print job formatting flow ("formatting flow") 100. Formatting flow 100 may be used to configure a printing device to carry out operations for such flow.

At operation 101, a plain text print job 110 may be received to a printing device. Sending text files directly to a printer is possible whether such printer is shared from a network server or connected directly to such printer that prints a print job.

In this example, such a plain text print job 110 is received via a USB interface 99 or a network interface 98. However, one or more of these or another interface for communicating a plain text print job 110 to a printing device may be used, including a wireless interface. By a plain text print job, it is generally meant a print job having only plain text without any printer language formatting and which plain text is user readable. A plain text file may have a .txt file type. For example, any group, block or string of only alphanumeric characters is an example of plain text. However, in another example, plain text may include a markup language, such as for example a Markdown language having a .md file type. However, .doc, .pdf, .or other file types have formatting, and thus would not be a plain text file type.

At operation 102, it may be determined whether such a received plain text file has highlighting or formatting therefor activated, such as by a default setting in a user interface ("UI") to such printing device. If such a plain text file does have highlighting or formatting activated therefore in a UI, such plain text file is no longer treated as a plain text file by printing text or content of such plain text file with such default formatting at operation 113.

If, however, at operation 102 it is determined that such a received plain text file does not have highlighting or formatting therefor activated, then such plain text file is treated as a plain text file by printing text or content of such plain text file with such default formatting at operation 113.

Analyzing of content at operation 103 may for example be to determine whether plain text is for source code selected from C, C++, Java, JavaScript, Go, PHP, Python, Pascal, or other source code language. Analyzing at operation 103 may include checking such content against keywords, functions, numbers, strings, or syntax associated with one or more types of source code to indicate whether such plain text is for a source code. Optionally, such analyzing may be to determine whether such plain text is additionally for a markup language, such as for example a Markdown language. For purposes of clarity by way of example and not limitation, it shall be assumed that either or both a source code or a Markdown file may be processed at operation 103 for a print job having only plain text.

At operation 104, it may be determined whether plain text analyzed at operation 103 is for a type of source code responsive to such analyzing. Optionally, it may be determined whether plain text analyzed at operation 103 is for a source code content or a Markdown content responsive to such analyzing. If at operation 104 in this example it is determined that content analyzed at operation 103 is neither source code or Markdown content, then such plain text file is no longer treated as a plain text file by formatting flow 100 by printing text or content of such plain text file with a default formatting set in a printing device at operation 113.

If, however, at operation 104 it is determined that plain text analyzed at operation 103 is for a source code content, or optionally Markdown content, responsive to such analyzing, then at operation 105 it may be determined whether a color or formatting template is available for a file type of a current file being processed, such as for a received plain text print job 110.

If at operation 105 it is determined that a color or formatting template is not available for a file type of a current file being processed, then at operation 113 such plain text file is no longer treated as a recognized text file by printing text or content of such plain text file with a default formatting.

If, however, at operation 105 it is determined that a color or formatting template is available for a file type of a current file being processed, then such color or formatting template is selected according to identified or recognized file type for a source code, or optionally a Markdown markup language.

At operation 106, it may be determined whether a format preview is activated. If at operation 106 it is determined that a format preview is not activated, then at operation 112 such text file may be printed using a selected color or format template responsive to a file type identified or determined, namely recognized.

At operation 112, such plain text recognized as source code may be formatted for printing responsive to a template stored in a printing device for a source code file type determined for such plain text. Further at operation 112, or in a separate operation in another example, such plaint text recognized as source code may be printed as formatted with such current file type format template selection.

For example, if a printing device is a color printer or MFP, such a printing device may be configured with formatting flow 100 to analyze content of a text file to be printed to determine if a file type can be determined from such content. If a file type can be determined, then such printing device can automatically apply color syntax highlight to such text file to produce a more readable output.

For different types of files, same or different color highlights can be applied. For example, for programming language source code files, different color schemes can be assigned by templates to programming languages, like C++, Java, or JavaScript. Optionally, markup language files, such as for example Markdown (.md) files, may have color scheme templates correspondingly assigned. Such templates, along with formatting flow 100, may be stored in memory of a printing device.

A Markdown file is in a different category than a source code file, as in the former type a text file therefor itself contains certain character sequences that correspond to text formatting instructions. So, for .md formats and the like, instead of applying color templates to an input text file, such text file is formatted according to built-in formatting instructions of such .md file. Along those lines, for a Markdown identified content, a file type template may be for formatting such plain text by application of different font sizes, styles, and positioning. However, a template for a Markdown language may be configured to cause a printing device to perform a printing to be in different colors or shades of gray for keywords, functions, numbers, strings, or syntax of such Markdown language.

If at operation 106 it is determined that a format preview is activated, then at operation 107 a first page of such text file may be displayed, such as on a display screen of a printing device, or a display screen of a computer system in communication with such a printing device. However, for purposes of clarity by way of example and not limitation, a printing device display is assumed. Such a display of a first page, namely a first page preview, may be provided using a file type template, namely a template selected from a library of templates for an identified file type of such text file.

A print job using a file type template may include a color syntax highlight. A color syntax highlight of a template may be used when printing a plain text file that is recognized as a source code module. Along those lines, different parts of a source code listing, such as keywords, functions, numbers, strings, or other source code listing parts, can be printed using different colors or different shades of gray corresponding to such parts. For example, keywords may be printed in a different color than functions. Furthermore, different keywords may be printed in different colors. These are just two of many examples of combinations of same or different colors for different source code parts.

Generally, a print job includes input data that a computer sends to a printing device to describe a desired output. Along those lines, a print job may include a header. A header conventionally leads a print job packet(s) or other grouping, and conventionally uses Printer Job Language (PJL) to describe such print job. Such header may include: a job name; a user name (i.e., the user initiating such print job); a description of pages to be printed, conventionally in a Page Description Language (PDL); and other know information. Print job data or job data conventionally is included in page(s) in a PDL format.

While formatting flow 100 can work with a conventional print job with a header, formatting flow 100 is not limited to a conventional print job. Rather, formatting flow 100 can work with a print job having no header. Furthermore, formatting flow need not include a job data in one or more pages in a PDL format. Rather, formatting flow 100 can work with job data that is only plain text, in which event a printer configured with formatting flow 100 may print plain text using default built-in font and black color or as otherwise described herein. Accordingly, formatting flow 100 can be used for print jobs without either or both a header or job data in a PDL page format, namely no page format.

After display of a preview at operation 107, at operation 108 a user may be prompted, such as by display of a user override option at operation 107 on a display screen of a printing device, as to whether to deactivate such file type template formatting. If a user elects to deactivate a selected file type template formatting, then a print operation 113 may be performed as previously described. If, however, a user does not deactivate a selected file type template formatting as determined at operation 108, then at operation 109 it may be determined whether a user accepted a current formatting selection, namely a current file type template.

If at operation 109 it is determined that a user accepted a current formatting selection, namely a current file type template selected by formatting flow 100, then a format and print operation 112 may be performed as previously described herein using such a current file type template. If, however, at operation 109 it is determined that a user did not accept a current formatting selection, namely a current file type template selected by formatting flow 100, then a user has selected a different file type template. At operation 111, a switch to a user selected file type template may be performed, and at operation 107, a preview of a first page using a newly selected file type template may be displayed. Along those lines, one or more operations of a file type template override routine or loop 115, namely operations 108, 109, or 111 staring from operation 107, may be repeated.

When a printing device is configured with formatting flow 100, such as accessible through a printer driver user-interface or on a printer's control panel, such a printing device may be configured to perform internal processing on plain text print jobs as previously described. Along those lines, firmware of such a printing device may be configured to analyze content of text and try to recognize certain content types responsive to receiving a plain text input without any header and/or PDL formatting. Furthermore, such a printing device may optionally support a user interface configured to allow a user to select between different color schemes for supported or recognized text file types. Plain text file types can correspond to source code or other text file types, such as Markdown or the like, that can be formatted based solely on text file content. Furthermore, a printer UI may be configured to allow a user to activate or deactivate plain text file recognition, namely to activate or deactivate formatting flow 100 code.

Figure 2:
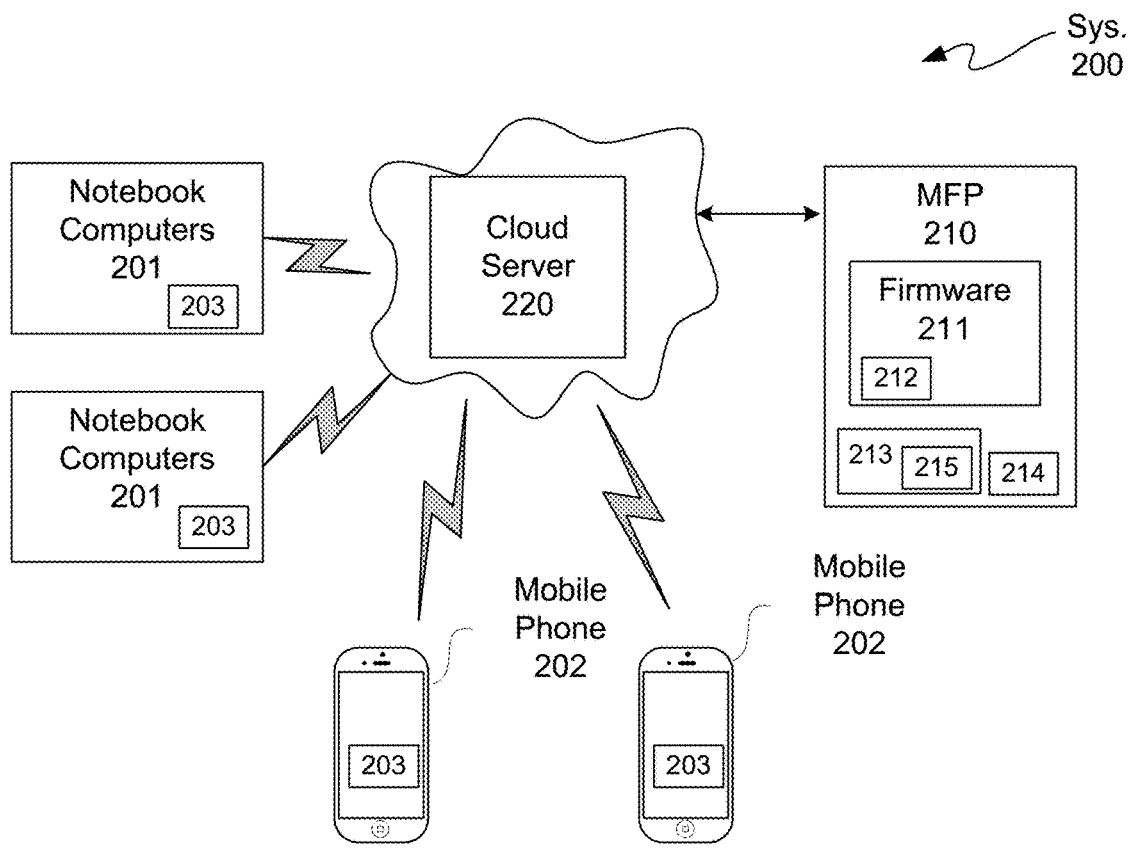
FIG. 2 is a block diagram depicting an example of a printing system.

FIG. 2 is a block diagram depicting an example of a printing system 200. Printing system 200 may include a cloud-based server 220 and a computerized printing device 210.

In this example, a computerized printing device 210 is an MFP; however, a dedicated printer or other printing device may be used in another example. In communication with MFP 210 may be one or more users, such as one or more notebook computers 201 and/or one or more smart mobile phones 202.

In this example, notebook computers 201 and mobile phones 202 are in wireless communication with a cloud-based server 220 for wired communication with MFP 210; however, other types of wired and/or wireless network topologies may be used. Each user device may be configured with a driver user interface 203 for remotely operating MFP 210 for configuration and execution of program code 212 of firmware 211.

In this example, MFP 210 has firmware 211 configured with program code 212 for carrying out one or more operations as previously described with reference to formatting flow 100. Program code 212 may have access to storage memory, such as of MFP 210 in this example, to access a library 213 of file type templates 215. Additionally, a memory port on MFP 210 may be used to allow a user to add support for other color-templates for additional file types. A physical memory port may be for a USB memory stick for example.

As previously described, firmware 211 via program code 212 may be configured to cause MFP 210, or more particularly one or more processor cores thereof, to analyze plain text of a print job received by such printing device for content; determine whether such plain text is for a type of coding; format such plain text responsive to a template stored in or accessible by printing device for a type of coding identified; and print such plain text formatted according to such template. A type of coding may be a source code, as previously described. However, in another example, a type of coding may be a markup language, such as Markdown for example.

Figure 3:
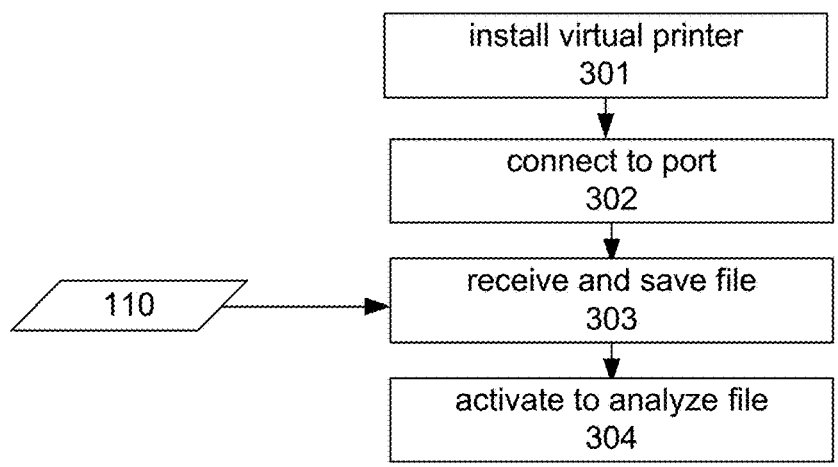
FIG. 3 is a flow diagram depicting an example of a virtual print-to-print flow.

FIG. 3 is a flow diagram depicting an example of a virtual print-to-print flow 300. Virtual print-to-print flow 300 is further described with simultaneous reference to FIGS. 1 through 3.

Firmware 211 may be configured to install a virtual printer or virtual printer driver 214 into memory of MFP 210 at operation 301. A virtual printer may be configured to connect to a port at operation 302 having a print job. Such a file may be a plain text print job 110 received.

A plain text print job 110 may be received and saved as a file at operation 303. Such a print job file may be analyzed as in formatting flow 100, as previously described, for coding. In an example, a print job file may be analyzed for coding after saving. Again, such analysis of content of a plain text print job 110 may be for source code; however, in another example, such analysis of content of a plain text print job 110 may be for a markup language, such as Markdown for example.

Whether accessed from a driver user interface 203, or directly from a control panel of a printing device, program code 212 of firmware 211 may be activated to analyze a plain text print job 110 file at operation 304. From there program code 212 may process such plain text print job 110 file as previously described.

To briefly recapitulate, in an example, a printing device may receive a plain text file, attempt to analyze content of such file, and, if a certain format (programming language) is recognized, apply custom color assigned to keywords of such programming language based on a template selected, which may be assigned in advance by a user, for that file type. In another example, if a plain text file is recognized as having Markdown content, then a different formatting template may be applied that uses a single color but formats plain text by applying different font sizes, styles and positioning. If text content is not recognized or not supported, a plain text file may be printed using a default rendering.

Because firmware first tries to determine a file type programmatically, it is possible that it detects an incorrect type. However, a user may be allowed to manually override a detected file type before a plain text file is actually printed, including providing a preview of a first page to be printed.

Such a preview may display the name of a file type and possibly the name of a selected color template, including in an example where multiple color templates are assigned to a same file type.

Because one or more of the examples described herein may be implemented in using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

Figure 4:
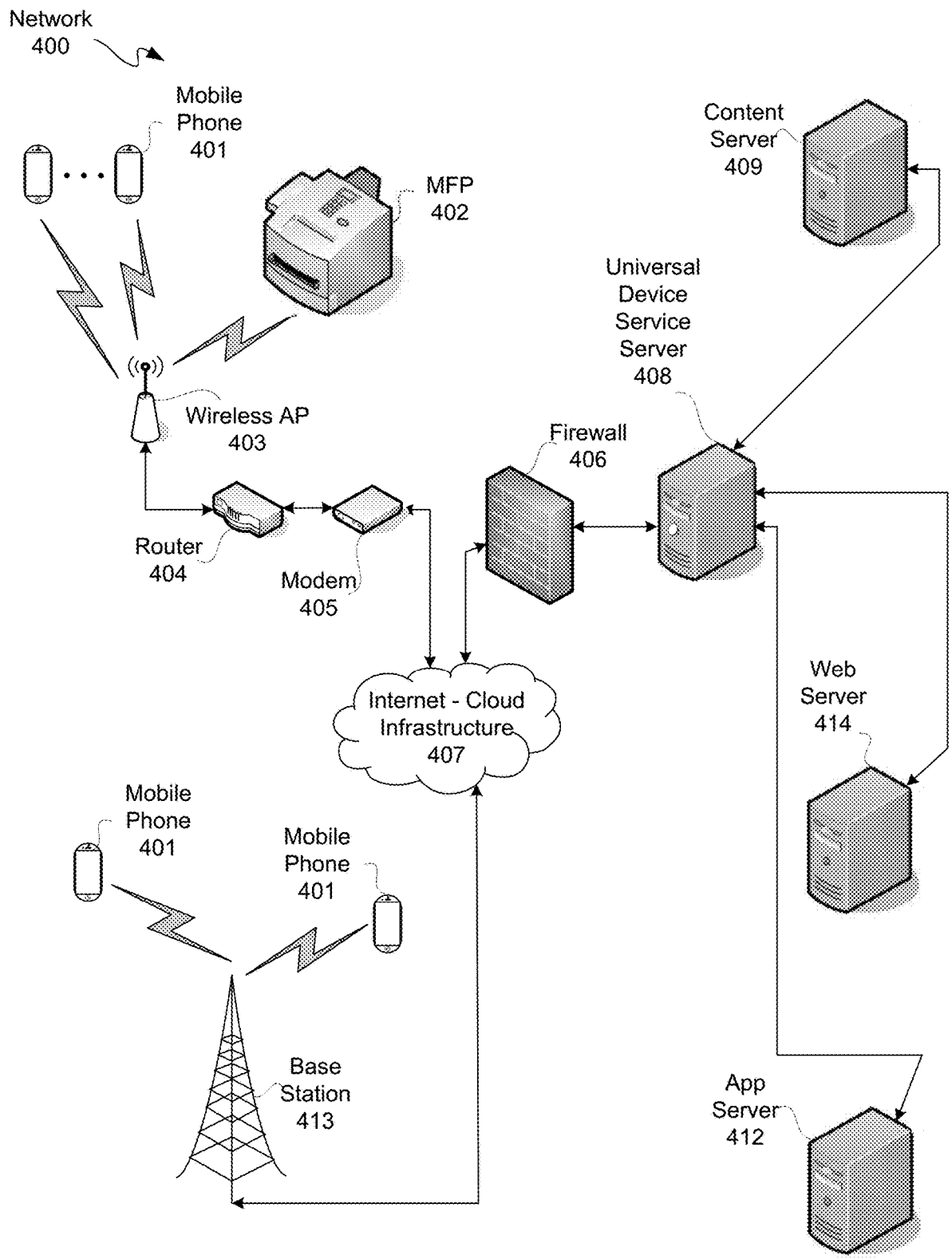
FIG. 4 is a pictorial diagram depicting an example of a network.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401, such as mobile phones, tablets, notebooks, and/or other such device, may be in wireless communication with a base station 413. Additionally, a desktop computer and/or a printing device, such as for example a multi-function printer ("MFP") 402, each of which may be web-usable devices, may be in wireless and/or wired communication to and from router 404.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
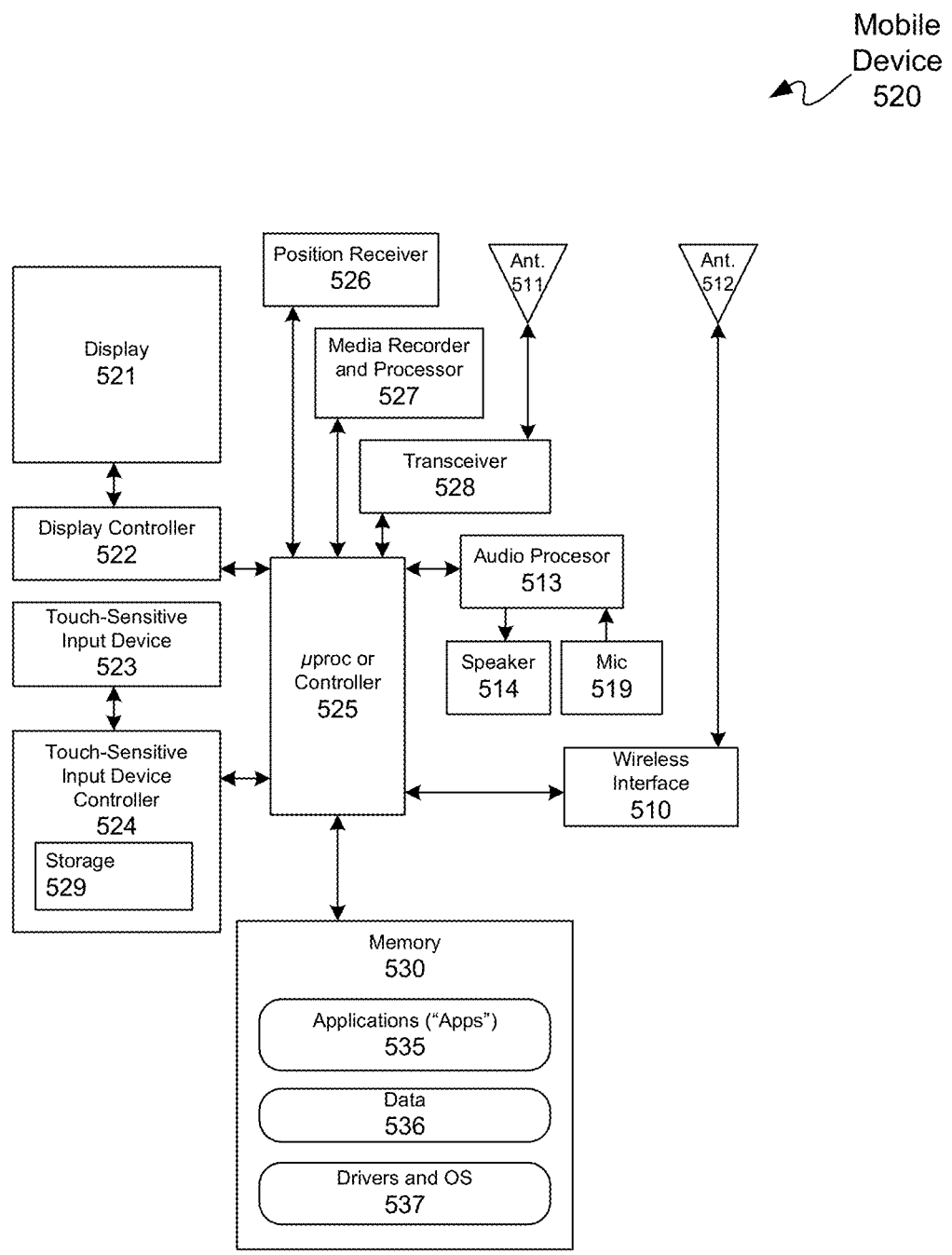
FIG. 5 is block diagram depicting an example of a portable communication device.

FIG. 5 is block diagram depicting an example of a portable communication device ("mobile device") 520. Mobile device 520 may be an example of a mobile device, as previously described.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder and processor 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps as described hereinabove may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
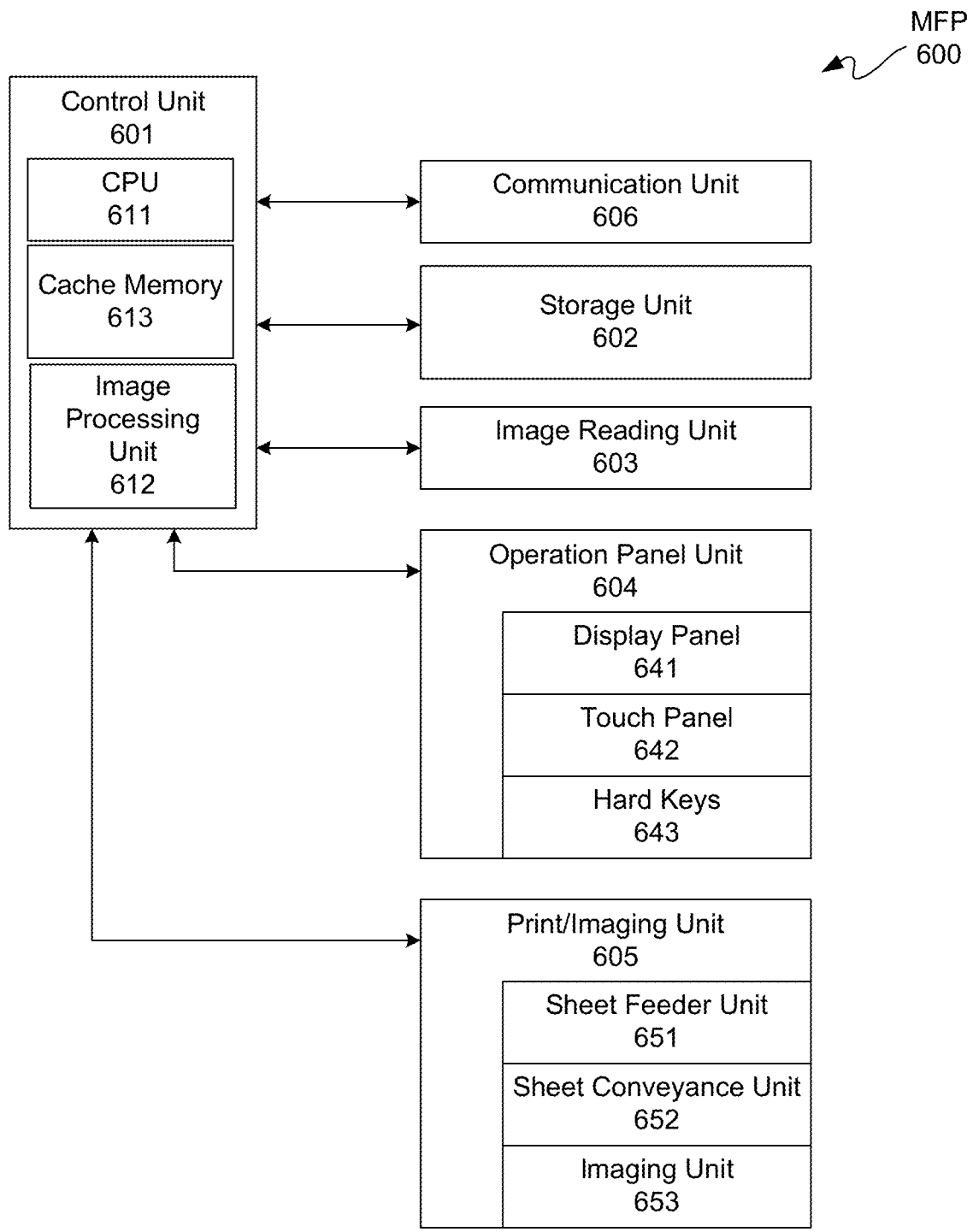
FIG. 6 is a block diagram depicting an example of a multi-function printer.

FIG. 6 is a block diagram depicting an example of an MFP 600. MFP 600 is provided for purposes of clarity by way of non-limiting example. MFP 600 is an example of an information processing system such as for handling a printer job as previously described. MFP 600 may be an example of an MFP 151 of FIG. 1-2.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation any printer resident printer driver components. A buffer queue may be located in cache memory 613 or storage unit 602. Storage unit 602 may store a GUI library or database.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
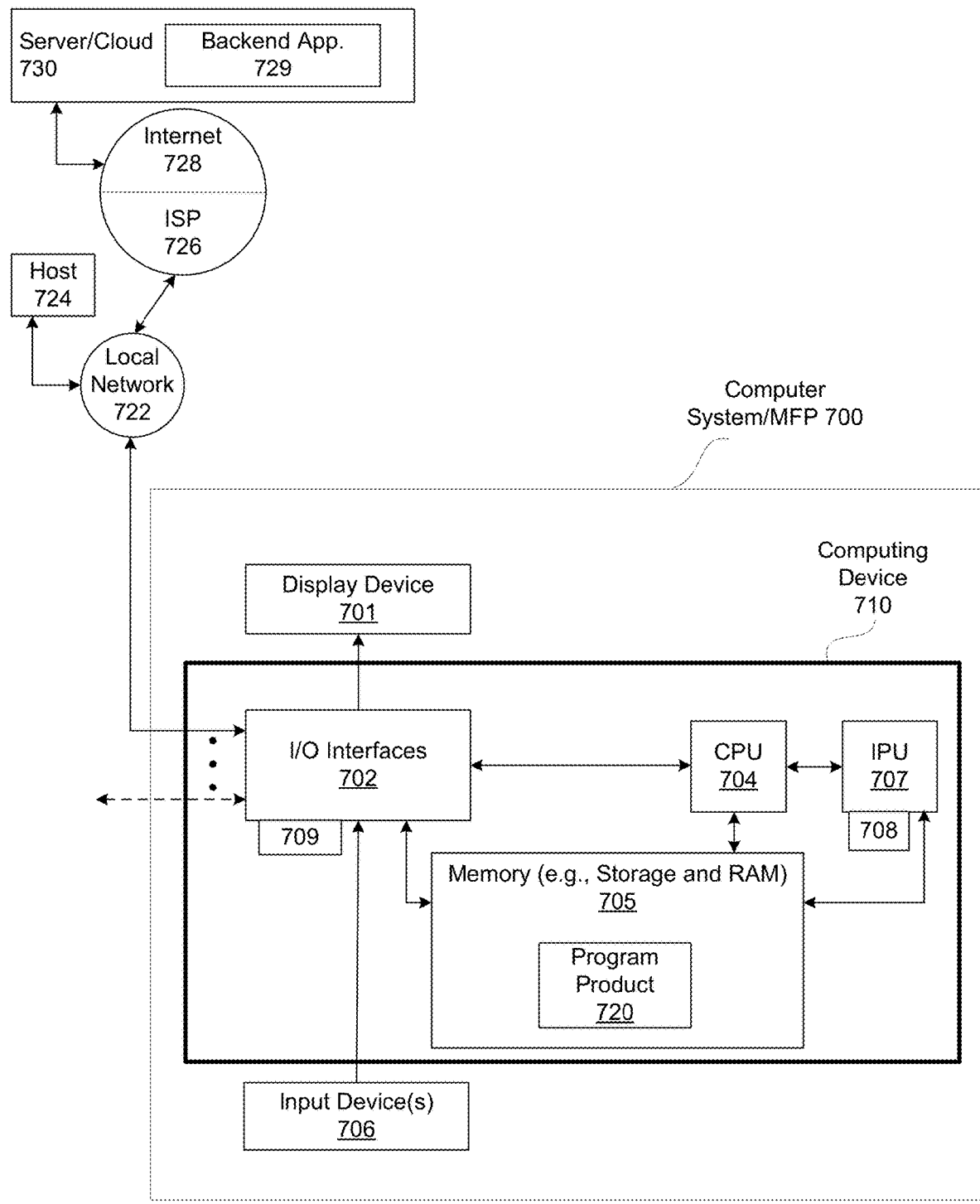
FIG. 7 is a block diagram depicting an example of a computer system.

FIG. 7 is a block diagram depicting an example of a computer system 700 upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 may be of an MFP. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application 729 for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method, comprising:
   receiving a print job having plain text by a printing device;
   analyzing content of the plain text in the print job;
   determining the plain text is for a source code responsive to the analyzing;
   formatting the plain text responsive to a template stored for the source code;
   wherein the analyzing of the content for the source code indicates keywords, functions, numbers, strings, or syntax associated with the source code; and
   displaying a user override option on a screen display of the printing device responsive to the determining of the source code.

2. The method according to claim 1, further comprising:
   obtaining the template from a library stored in a memory of the printing device; and
   printing the plain text formatted according to the template;
   wherein the template causes the printing device to perform the printing to be in different colors or shades of gray for keywords, functions, numbers, strings, or syntax of the source code.

3. The method according to claim 2, wherein the analyzing of the content is to determine the plain text is for the source code selected from C, C++, Java, JavaScript, Go, PHP, Python, or Pascal.

4. The method according to claim 1, where in the printing device is a multi-function printer.

5. A method, comprising:
   receiving a print job having plain text by a printing device;
   analyzing content of the plain text in the print job;
   determining the plain text is for a markup language responsive to the analyzing; and
   formatting the plain text responsive to a template stored for the markup language;
   obtaining the template from a library stored in a memory of the printing device; and
   printing the plain text formatted according to the template;
   wherein the analyzing of the content is to determine the plain text is for the markup language being a Markdown language.

6. The method according to claim 5, wherein the template causes the printing device to perform the printing to be in formatting for different font sizes, styles, and positioning responsive to the template.

7. The method according to claim 5, wherein the analyzing of the content indicates keywords, functions, numbers, strings, or syntax associated with the Markdown language.

8. The method according to claim 5, further comprising displaying a user override option on a display screen of the printing device responsive to the determining the plain text is for the source code.

9. The method according to claim 8, where in the printing device is a multi-function printer.

10. A system, comprising:
    a printing device having firmware; and
    the firmware configured to:
      analyze plain text of a print job received by the printing device for content;
      determine whether the plain text is for a type of coding;
      format the plain text responsive to a template stored in or accessible by the printing device for the type of coding identified;
      print the plain text formatted according to the template;
      wherein the type of coding is a markup language; and
      wherein the markup language is a Markdown language.

11. The system according to claim 10, wherein the type of coding is a source code selected from C, C++, Java, JavaScript, Go, PHP, Python, or Pascal.

12. The system according to claim 10, wherein the firmware is further configured to:
    install a virtual printer;
    connect the virtual printer to a port to save a file having the print job; and
    save the print job as the file for analysis of the plain text.

13. The system according to claim 10, wherein the print job includes no page format and no header.

14. The system according to claim 10, further comprising a driver user interface configured to activate the firmware for analysis of the plain text.

* * * * *